United States Patent
Shim

(10) Patent No.: US 9,367,957 B2
(45) Date of Patent: Jun. 14, 2016

(54) APPARATUS AND METHOD FOR GENERATING 3D OBJECT

(71) Applicant: SK PLANET CO., LTD., Seongnam-si, Gyeonggi-do (KR)

(72) Inventor: Wook Shim, Seoul (KR)

(73) Assignee: SK PLANET CO., LTD., Seongnam-Si, Gyeonggi-Do (KR)

( * ) Notice: Subject to any disclaimer, the term of this patent is extended or adjusted under 35 U.S.C. 154(b) by 161 days.

(21) Appl. No.: 14/346,564

(22) PCT Filed: Jul. 31, 2013

(86) PCT No.: PCT/KR2013/006915
§ 371 (c)(1),
(2) Date: Mar. 21, 2014

(87) PCT Pub. No.: WO2014/051250
PCT Pub. Date: Apr. 3, 2014

(65) Prior Publication Data
US 2015/0371441 A1   Dec. 24, 2015

(30) Foreign Application Priority Data

Sep. 26, 2012 (KR) .................. 10-2012-0107025

(51) Int. Cl.
| | |
|---|---|
| *G06T 17/10* | (2006.01) |
| *G06T 17/00* | (2006.01) |
| *G06F 17/22* | (2006.01) |
| *G06T 1/60* | (2006.01) |

(Continued)

(52) U.S. Cl.
CPC ............ *G06T 17/10* (2013.01); *G06F 17/2247* (2013.01); *G06T 1/60* (2013.01); *G06T 15/005* (2013.01); *G06T 15/20* (2013.01); *G06T 17/00* (2013.01); *G06T 19/20* (2013.01); *G06T 2200/04* (2013.01)

(58) Field of Classification Search
None
See application file for complete search history.

(56) References Cited

U.S. PATENT DOCUMENTS

| | | | | |
|---|---|---|---|---|
| 2010/0299596 | A1* | 11/2010 | Zalewski | G06F 1/1626 715/702 |
| 2012/0054192 | A1* | 3/2012 | Song | G06F 17/30887 707/741 |

FOREIGN PATENT DOCUMENTS

| | | |
|---|---|---|
| JP | 2005063287 A | 3/2005 |
| KR | 1020090098630 A | 9/2009 |

(Continued)

OTHER PUBLICATIONS

International Search Report mailed Nov. 19, 2013 for PCT/KR2013/006915.

(Continued)

*Primary Examiner* — Said Broome
(74) *Attorney, Agent, or Firm* — Hauptman Ham, LLP

(57) ABSTRACT

The present invention relates to an apparatus and method for generating a 3D object. The apparatus includes a 3D object generation unit for generating a 3D object by latticizing and dividing the structural element of a 2D web page into a plurality of polygons and a 3D object manipulation processing unit for, when an object manipulation signal is inputted in the generated 3D object, generating 3D transform matrices by changing vertex coordinate values of respective lattice elements in response to the object manipulation signal and generating a transformed 3D object by applying the generated 3D transform matrices to predefined CSS transform.

17 Claims, 7 Drawing Sheets

(51) Int. Cl.
*G06T 15/00* (2011.01)
*G06T 15/20* (2011.01)
*G06T 19/20* (2011.01)

(56) References Cited

FOREIGN PATENT DOCUMENTS

| KR | 100955463 | B1 | 4/2010 |
| KR | 1020110001400 | A | 1/2011 |
| KR | 1020110024053 | A | 3/2011 |
| KR | 1020120082161 | A | 7/2012 |

OTHER PUBLICATIONS

Flanagan, David, JavaScript, Aug. 15, 2012, pp. 449-482, Oreilly Japan, Japan.

* cited by examiner

FIG. 7
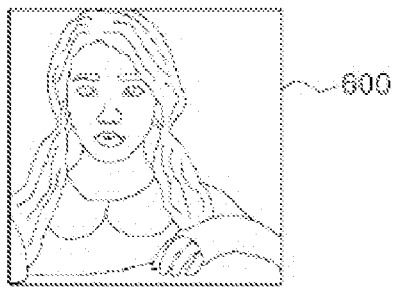
(a)
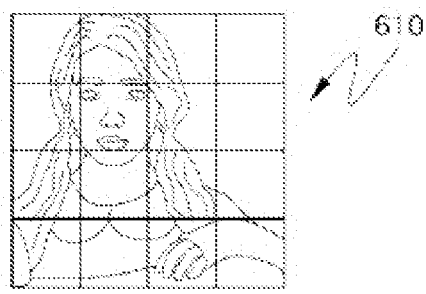
(b)
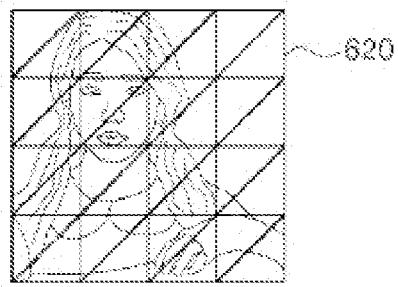
(c)
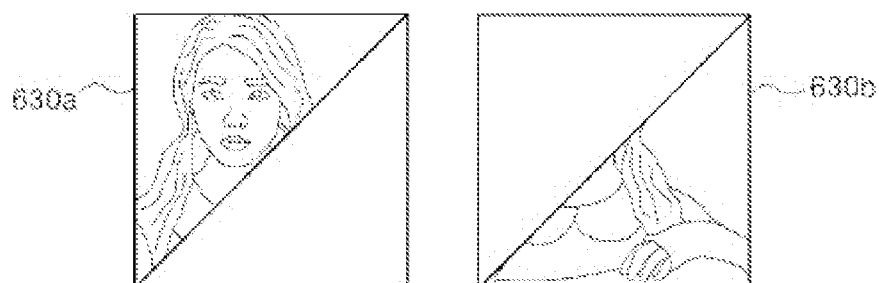
(d)

FIG. 9
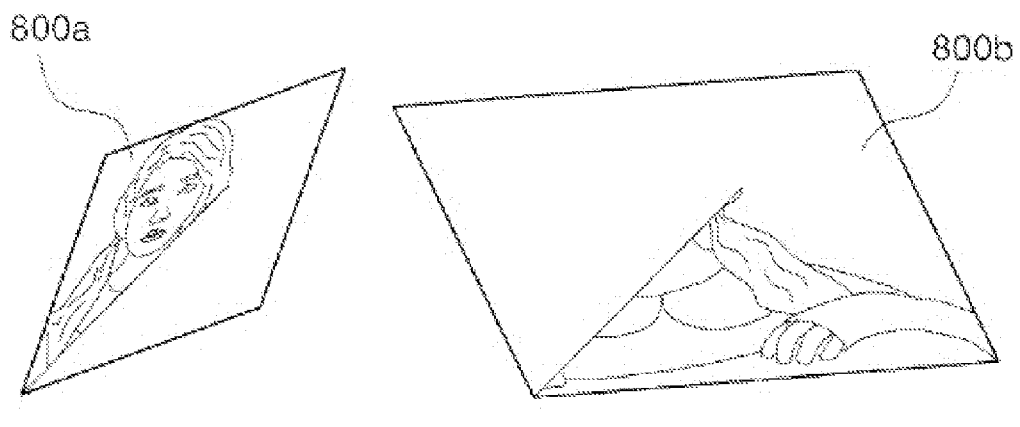
(a)
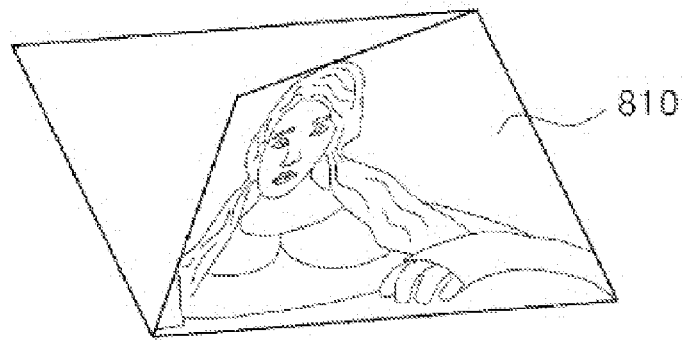
(b)

APPARATUS AND METHOD FOR GENERATING 3D OBJECT

CROSS REFERENCE TO RELATED APPLICATIONS

The present application claims priority to International Application PCT/KR2013/006915, with an International Filing Date of 31 Jul. 2013, which claims the benefit of Korean Patent Application No. 10-2012-0107025 filed in the Korean Intellectual Property Office on 26 Sep. 2012, the entire contents of which are incorporated herein by reference.

BACKGROUND OF THE INVENTION

1. Technical Field

The present invention relates to an apparatus and method for generating a 3D object and, more particularly, to an 3D object generation apparatus and method for generating a 3D object by latticizing the structural elements of a 2D web page and dividing the structural elements of the 2D web page into a plurality of polygons, generating a 3D transform matrix by changing a vertex coordinate value of an individual lattice element in response to an object manipulation signal when the object manipulation signal is received in the generated 3D object, and generating a transformed 3D object by applying predefined Cascading Style Sheet (CSS) transform to the generated 3D transform matrix.

2. Description of the Related Art

With a recent progress of automation and development toward an information society, computer graphics are rapidly applied to wide application fields. In particular, fields using 3D graphics are suddenly increased.

In most of conventional 3D object systems, a 3D object is generated and manipulated using a 3D polygon processing method. A polygon means a polygon, that is, the smallest unit used to represent a stereographic shape in 3D computer graphics.

Meanwhile, WebGL is used as a representative method for providing 3D technology in a web page. WebGL is technology similar to OpenGL that is the most basic and common 3D graphic technology and can be widely used in 3D games because a polygon object having a specific shape can be generated and manipulated through a low-level development environment.

However, WebGL is disadvantageous in that it supports only the latest browser, such as Chrome, in a PC environment and it is not supported in mobile devices for reason for performance and compatibility.

SUMMARY OF THE INVENTION

The present invention has been made to solve the above problems, and an object of the present invention is to provide an apparatus and method for generating a 3D object, which are capable of generating and manipulating a 3D object of a polygon form using only 'rotate', 'translate', and 'scale', that is, basic 3D transform techniques, and 'skew', that is, a 2D transform technique, by emulating a polygon of a triangle form using a quadrangle of a quadrangle form as a basic element.

Another object of the present invention is to provide an apparatus and method for generating a 3D object, which can implement effects, such as a Genie effect, 3D Morphing, and a page turn effect, using CSS 2D/3D transform technology that can be supported in mobile devices and also enable the generation and manipulation of a 3D object based on polygons.

Yet another object of the present invention is to provide an apparatus and method for generating a 3D object, which are capable of providing various user interfaces and graphic effects by generating and manipulating a 3D object based on a polygon having a specific form even in a limited environment (e.g., a mobile web) in which only basic 3D transform is supported.

Further yet another object of the present invention is to provide an apparatus and method for generating a 3D object, which are capable of generating a 3D object based on polygons through the latticization of web-based elements.

In accordance with an aspect of the present invention for achieving the objects, there is provided a 3D object generation apparatus, including a 3D object generation unit for generating a 3D object by latticizing and dividing the structural element of a 2D web page into a plurality of polygons and a 3D object manipulation processing unit for, when an object manipulation signal is inputted in the generated 3D object, generating 3D transform matrices by changing vertex coordinate values of respective lattice elements in response to the object manipulation signal and generating a transformed 3D object by applying the generated 3D transform matrices to predefined CSS transform.

The 3D object generation unit may include a quadrangle lattice element generation module for generating quadrangle lattice elements by equally dividing the structural element of the web page into a specific number of quadrangle lattices and a 3D object generation module for dividing vertexes of the respective generated quadrangle lattice elements into two triangles in a diagonal direction, copying the quadrangle lattice elements, and generating a plurality of polygons by controlling transparency so that only different triangle regions of two quadrangles are seen.

The quadrangle lattice element generation module may receive an individual image of a lattice form corresponding to the original image from a service providing apparatus or transform the original image into a bitmap form through internal operation within a browser and generate a lattice image if the structural element of the web page is an image and may generate the quadrangle lattice elements using a delimitation tag if the structural element of the web page is not an image.

The 3D object generation module may set the transparency of regions other than a triangle in which the structural element is seen to '0' so that a structural element is seen only in the triangles of different regions of two respective quadrangles.

The 3D object manipulation processing unit may include a coordinate value memory module for storing the vertex coordinate values of the respective lattice elements that form the 3D object generated by the 3D object generation unit, a 3D transform matrix generation module for, when the object manipulation signal is inputted, changing the vertex coordinate values of the respective lattice elements in response to the object manipulation signal and generating the 3D transform matrices of the respective lattice elements using the changed vertex coordinate values and the vertex coordinate values stored in the coordinate value memory module, and a 3D object transform module for generating the transformed 3D object by applying the generated 3D transform matrices to the CSS transform.

In accordance with another aspect of the present invention, there is provided a 3D object generation method in a method of generating and manipulating, by a 3D object generation apparatus, the structural element of a 2D web page into a 3D object, including steps of (a) generating quadrangle lattice elements by equally dividing the structural element of the web page into a specific number of quadrangle lattices and (b) connecting the vertexes of the generated quadrangle lattice elements in a diagonal direction, dividing the connected quadrangle lattice elements into two triangles, copying the quadrangle lattice elements, and generating the 3D object by controlling transparency so that only different triangle regions of two quadrangles are seen.

There is provided a 3D object generation method, further including steps of, when an object manipulation signal is inputted in the generated 3D object, changing vertex coordinate values of the respective lattice elements in response to the object manipulation signal and generating 3D transform matrices of the respective lattice elements using the changed vertex coordinate values and vertex coordinate values before being changed, after the step (b), and generating a transformed 3D object by applying the generated 3D transform matrices to predefined CSS transform.

In the step (b), an individual image of a lattice form corresponding to the original image may be received from a service providing apparatus or the original image may be transformed into a bitmap form through internal operation within a browser and a lattice image may be generated if the structural element of the web page is an image, and the quadrangle lattice elements may be generated using a delimitation tag if the structural element of the web page is not an image.

In accordance with yet another aspect of the present invention, there is provided an electronic device-readable recording medium on which a method for generating a 3D object is recorded in a program form, including steps of generating quadrangle lattice elements by equally dividing the structural element of a web page into a specific number of quadrangle lattices, connecting the vertexes of the generated quadrangle lattice elements in a diagonal direction, dividing the connected quadrangle lattice elements into two triangles, copying the quadrangle lattice elements, and generating a 3D object by controlling transparency so that two quadrangles are seen only in different triangle regions, when an object manipulation signal is inputted in the generated 3D object, changing a vertex coordinate value of each of the lattice elements in response to the object manipulation signal and generating 3D transform matrices of the respective lattice elements using the changed vertex coordinate values and the vertex coordinate values before being changed, and generating a transformed 3D object by applying the generated 3D transform matrices to predefined CSS transform.

BRIEF DESCRIPTION OF THE DRAWINGS

FIG. 7 is an exemplary diagram of screens illustrating a method for generating a 3D object in accordance with an embodiment of the present invention.

FIG. 9 is an exemplary diagram of screens illustrating a method for generating a transformed 3D object in accordance with an embodiment of the present invention.

DESCRIPTION OF REFERENCE NUMERALS OF PRINCIPAL ELEMENTS IN THE DRAWINGS

Figure 1:
FIG. 1 is a diagram showing a system for generating a 3D object in accordance with an embodiment of the present invention.

100: 3D object generation apparatus
110: communication unit
120: input unit 130: output unit
140: memory unit 150: 3D object generation unit
152: quadrangle lattice element generation module
154: 3D object generation module
160: 3D object manipulation processing unit
162: coordinate value memory module
164: 3D transform matrix generation module
166: 3D object transform module

DETAILED DESCRIPTION

The details of the aforementioned objects, technical construction, and operational effects of the present invention will be more clearly understood from the following detailed description based on the accompanying drawings attached to the specification of the present invention.

A Cascading Style Sheet (CSS) is technology for designating a screen configuration and rendering method of a web document, and CSS supports 2D transform, such as 'translate', 'rotate', 'scale', and 'skew' applied to a 2D plane coordinate system, 3D transform, such as 'translate3d', 'rotate3d', and 'scale3d' applied to a 3D stereographic coordinate system, and an animation effect between the transforms.

Furthermore, CSS is technology suitable for a simple manipulation of each of structural elements that make up a web document and has been used to provide simple UI structural elements, such as a menu bar/button/image, and a switching effect upon a movement between web pages. In the present invention, however, CSS may be used to generate and manipulate a specific 3D object by decomposing an individual structural element (in particular, image) of a web document into fragments of a quadrangle form and producing the fragments in a form similar to a polygon.

Technology in which a 3D object is generated and manipulated is described below with reference to the drawings.

FIG. 1 is a diagram showing a system for generating a 3D object in accordance with an embodiment of the present invention.

Referring to FIG. 1, the system for generating a 3D object includes a service providing apparatus 200 for providing a web or WAP page in response from a 3D object generation apparatus 100.

The 3D object generation apparatus 100 generates a 3D object by dividing a structural element of a 2D web page of a plane form into a plurality of polygons and generates a transformed 3D object by manipulating the position of the vertex of each of lattice elements included in the 3D object.

Such a 3D object generation apparatus 100 may be applied to any user device having a communication function and a short-range communication function. For example, the user device may include various types of devices, such as a notebook, a wireless communication terminal, a smart phone, a Portable Media Player (PMP), a Portable Digital Assistant (PDA), a tablet PC, a set-top box, and smart TV.

The 3D object generation apparatus 100 is described in detail with reference to FIG. 2.

The service providing apparatus 200 provides a web or WAP page to the 3D object generation apparatus 100 in response to a request from the 3D object generation apparatus 100.

Figure 2:
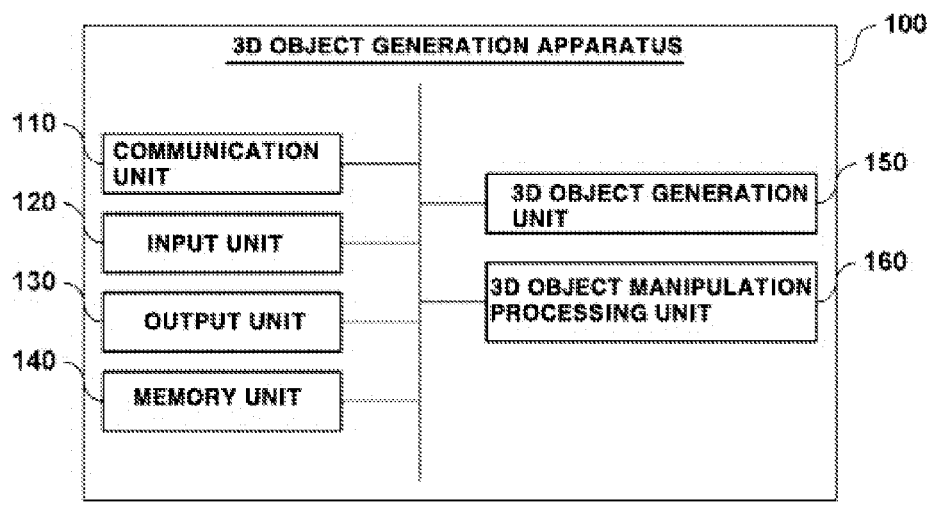
FIG. 2 is a block diagram schematically showing the construction of a 3D object generation apparatus in accordance with an embodiment of the present invention.
Figure 3:
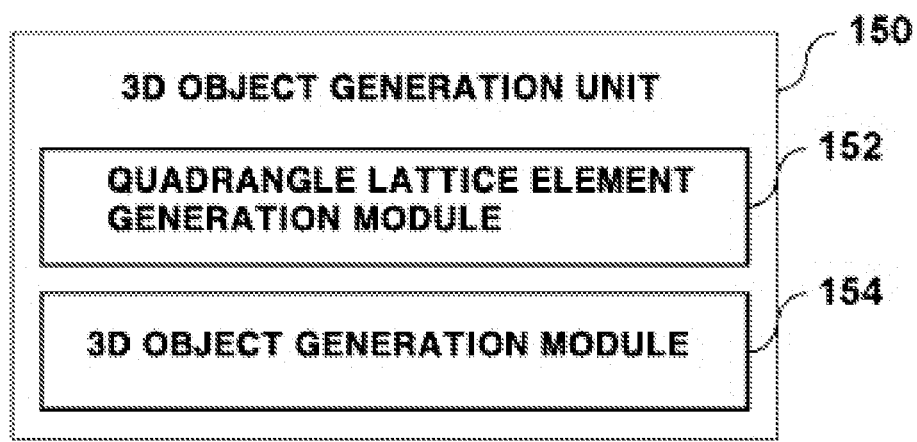
FIG. 3 is a detailed block diagram showing the construction of a 3D object generation unit shown in FIG. 2.
Figure 4:
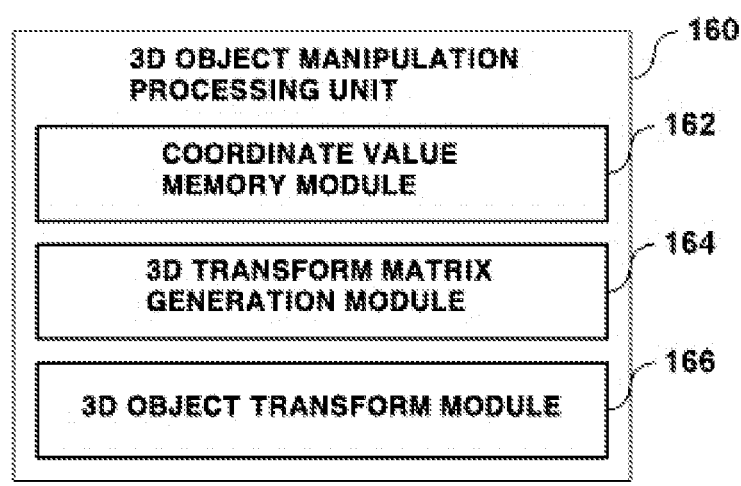
FIG. 4 is a detailed block diagram showing the construction of a –D object manipulation processing unit shown in FIG. 2.

FIG. 2 is a block diagram schematically showing the construction of the 3D object generation apparatus in accordance with an embodiment of the present invention, FIG. 3 is a detailed block diagram showing the construction of a 3D object generation unit shown in FIG. 2, and FIG. 4 is a detailed block diagram showing the construction of a –D object manipulation processing unit shown in FIG. 2.

Referring to FIG. 2, the 3D object generation apparatus 100 includes a communication unit 110 for transmitting and receiving data over a communication network, an input unit 120, an output unit 130, a memory unit 140, a 3D object generation unit 150, and a 3D object manipulation processing unit 160.

The communication unit 110 is communication means for connecting the 3D object generation apparatus 100 and the service providing apparatus over a communication network, and it may include, for example, a wireless communication module, such as mobile communication and satellite communication, a wired communication module, such as the Internet, a short-range wireless communication module, such as Wi-Fi.

The input unit 120 is means for receiving a user request for controlling the operation of the 3D object generation apparatus 100, and it converts a user request into an electrical signal in response to a user's manipulation. The input unit 120 refers to key input means for receiving the alphabet, numbers, and text information from a user, and the key input means may be implemented using a keyboard, a keypad, or a touch screen.

The output unit 130 displays data for a web site that has been accessed by the 3D object generation apparatus 100. Furthermore, the output unit 130 refers to display means for displaying screen information according to the driving of an application. The output unit 130 preferably is implemented using a small-sized flat panel display device, such as a Liquid Crystal Display (LCD) or Organic Light Emitting Diodes (OLED). Furthermore, the output unit 130 may be formed in a touch screen form along with the input unit 120.

The memory unit 140 stores programs necessary to control the operation of the 3D object generation apparatus 100 and data generated when the programs are executed.

The 3D object generation unit 150 generates a 3D object by dividing a corresponding structural element into a plurality of polygons through the latticization of the structural elements of a 2D web page. The 3D object is represented by a plurality of polygons. In general, a polygon has any one form of a dot, a line, and a triangle. A triangular polygon is represented by coordinates (x, y, z) and other attributes (e.g., color and texture coordinates) in its each vertex. The coordinates (x, y) of a polygon vertex indicate a position on the output unit 130. The coordinate (z) indicates that the vertex is spaced apart from a selected view point of a 3D scene.

The 3D object generation unit 150 is described below with reference to FIG. 3. The 3D object generation unit 150 includes a quadrangle lattice element generation module 152 and a 3D object generation module 154.

The quadrangle lattice element generation module 152 generates a quadrangle lattice element by dividing the structural element of a web page into a specific number of equal quadrangle lattices. The structural element of the web page may include an object, such as an image, text, etc. Accordingly, if the structural element of a web page is an image, the quadrangle lattice element generation module 152 can receive an individual image of a lattice form, corresponding to the original image, from the service providing apparatus. Furthermore, the quadrangle lattice element generation module 152 can transform the original image into a bitmap form through internal operation within a browser using Javascript, etc. and then generate a lattice image. Furthermore, if the structural element of a web page is not an image, the quadrangle lattice element generation module 152 can generate a quadrangle lattice element by decomposing a corresponding structural element into quadrangle lattices using a delimitation tag, such as <div> or <span>.

The 3D object generation module 154 generates a plurality of polygons by connecting the vertexes of quadrangle lattice elements, generated by the quadrangle lattice element generation module 152, in a diagonal direction, dividing the connected quadrangle lattice elements into two triangles, copying the quadrangle lattice elements, and controlling the transparency of each quadrangle lattice element so that only different triangle regions of two quadrangles are seen. Here, a structural element formed of a plurality of generated polygons may be a 3D object. That is, the 3D object generation module 154 connects the vertexes of quadrangle lattice elements in a diagonal direction, divides the connected lattice elements into two triangles, copies two pairs of corresponding quadrangle lattice elements, and controls the transparency of each triangle region so that only different triangle regions of two quadrangles are seen. For example, in the case of an image, the 3D object generation module 154 sets transparency (alpha value) to '0' in regions other than a triangle that is seen so that an image is seen in the triangles of different regions of the two quadrangles. Furthermore, in the case of an element other than an image, the 3D object generation module 154 may set transparency (alpha value) to '1' in a triangle on one side and transparency (alpha value) to '0' in a triangle on the other side so that a structural element is seen only in the triangle on one side.

Referring back to FIG. 2, when an object manipulation signal is received in a 3D object generated by the 3D object generation unit 150, the 3D object manipulation processing unit 160 generates a 3D transform matrix by changing a vertex coordinate value of an individual lattice element in response to the object manipulation signal and generates a transformed 3D object by applying the generated 3D transform matrix to predefined CSS transform. That is, after a 3D object is generated, the original image or a shape of a structural element can be able to be freely transformed by manipulating the position of the vertex of an individual lattice element included in the 3D object. Accordingly, when an object manipulation signal is received, the 3D object manipulation processing unit 160 can transform the original image into a 3D object of a specific form by properly transforming a shape of a lattice element in accordance with 3D transform in response to the object manipulation signal.

The 3D object manipulation processing unit 160 is described below with reference to FIG. 4. The 3D object manipulation processing unit 160 includes a coordinate value memory module 162, a 3D transform matrix generation module 164, and a 3D object transform module 166.

The coordinate value memory module 162 stores vertex coordinate values of respective lattice elements that make up a 3D object generated by the 3D object generation unit 150. Here, the coordinate value memory module 162 can store the vertex coordinate values of the respective lattice elements in an array form.

When an object manipulation signal is received in a 3D object generated by the 3D object generation unit 150, the 3D transform matrix generation module 164 changes a vertex coordinate value of each lattice element in response to the object manipulation signal and generates the 3D transform matrix of each lattice element using the changed vertex coordinate value and a vertex coordinate value stored in the coordinate value memory module 162.

That is, if a user moves an individual lattice element of a 3D object using a touch input or a mouse or an individual lattice element is moved in response to an event, such as stored animation logic, the 3D transform matrix generation module 164 determines that an object manipulation signal has been received, changes vertex coordinate values of respective lattice elements in response to the object manipulation signal, and generates 3D transform matrices necessary for CSS operation by performing matrix operation on all the lattice elements. Here, the generated 3D transform matrices may have different values in the lattice elements. Meanwhile, the 3D transform matrix generation module 164 does not include a vertex that is not seen in a screen (i.e., a vertex in a transparent triangle region) in the operation.

A method of generating, by the 3D transform matrix generation module 164, a 3D transform matrix is described below. Assuming that current values of three vertexes seen on a scene are O1(x1, y1, z1), O2(x2, y2, z2), and O3(x3, y3, z3), respectively, vertex coordinate values changed in response to an object manipulation signal are D1(a1, b1, c1), D2(a2, b2, c2), and D3(a3, b3, c3), and a transform matrix to be obtained is M, the 3D transform matrix generation module 164 needs to satisfy a matrix equation 'M*O1=D1, M*O2=D2, M*O3=D3'.

In the case of a 3×3 matrix, M can be easily obtained by multiplying an inverse matrix of a matrix $P_{origin}$ in O1, O2, and O3 correspond to a column in front of a matrix $P_{destination}$ in which D1, D2, and D3 correspond to a column. In a common transform matrix, however, in order to apply 'translate' and 'perspective transform', a matrix equation $M_{transform}$, such as Mathematical Equation 1, is established in a 4×4 form not a 3×3 form. In such a case, an inverse matrix is not present because there are several solutions.

$$M_{transform} * P_{origin} = P_{destination} \quad \text{[Mathematical Equation 1]}$$

$$\begin{pmatrix} a & b & c & t_x \\ d & e & f & t_y \\ g & h & i & t_z \\ 0 & 0 & 0 & 1 \end{pmatrix} \begin{pmatrix} x_1 & x_2 & x_3 \\ x_1 & x_2 & x_3 \\ y_1 & y_2 & y_3 \\ 1 & 1 & 1 \end{pmatrix} =$$

$$\begin{pmatrix} a_1 & a_2 & a_3 \\ b_1 & b_2 & b_3 \\ c_1 & c_2 & c_3 \\ 1 & 1 & 1 \end{pmatrix}$$

Therefore, in order to solve the problem, the 3D transform matrix generation module 164 uses a method of individually calculating scale, translate, rotate, and skew matrices. If a transform matrix is reconfigured in a 3×3 form other than parts related to Translate (tx, ty, tz) and perspective (0 0 0 1), Mathematical Equation 2 is obtained.

$$M_{T'} * P_{o'} = P_{d'} \; (without transition) \quad \text{[Mathematical Equation 2]}$$

$$\begin{pmatrix} a & b & c \\ d & e & f \\ g & h & i \end{pmatrix} \begin{pmatrix} x_1 & x_2 & x_3 \\ x_1 & x_2 & x_3 \\ y_1 & y_2 & y_3 \end{pmatrix} = \begin{pmatrix} a_1 & a_2 & a_3 \\ b_1 & b_2 & b_3 \\ c_1 & c_2 & c_3 \end{pmatrix}$$

Here, $M_{T'}$ may be a matrix reconfigured from $M_{transform}$, $P_{o'}$ may be a matrix reconfigured from $P_{origin}$, and $P_{d'}$ may be a matrix reconfigured from $P_{destination}$.

If the $M_{T'}$ matrix of Mathematical Equation 2 is decomposed into scale, rotate, and skew matrices, Mathematical Equation 3 is obtained $$M_{T'} = M_{Rotate} * M_{skew} * M_{cale} \quad \text{[Mathematical Equation 3]}$$

$$\begin{pmatrix} a & b & c \\ d & e & f \\ g & h & i \end{pmatrix} =$$

$$\begin{pmatrix} R_a & R_b & R_c \\ R_d & R_e & R_f \\ R_g & R_h & R_i \end{pmatrix} \begin{pmatrix} 1 & X_k & 0 \\ Y_k & 1 & 0 \\ 0 & 0 & 1 \end{pmatrix} \begin{pmatrix} X_s & 0 & 0 \\ 0 & Y_s & 0 \\ 0 & 0 & 1 \end{pmatrix}$$

Here, $M_{Rotate}$ may be a rotate matrix, $M_{skew}$ may be a skew matrix, and $M_{scale}$ may be a scale matrix.

The rotation matrix $M_{Rotate}$ can be obtained as in Mathematical Equation 5 by generating a matrix B, such as Mathematical Equation 4, using the original coordinates and the changed coordinate values and then performing singular value decomposition.

$$B = \quad \text{[Mathematical Equation 4]}$$

$$\begin{pmatrix} a1 \\ b1 \\ c1 \end{pmatrix} (x1 \; y1 \; z1) + \begin{pmatrix} a2 \\ b2 \\ c2 \end{pmatrix} (x2 \; y2 \; z2) +$$

$$\begin{pmatrix} a3 \\ b3 \\ c3 \end{pmatrix} (x3 \; y3 \; z3) =$$

$UMV^T$ (by $SingularValueDecomposition$)

$$M_{Rotate} = UMV^T \quad \text{[Mathematical Equation 5]}$$

$$M = diag([( 1 \; 1 \;\; det(U) \;\; det(V) )])$$

The skew matrix and the scale matrix can be obtained relatively simply through a difference between the lengths of the sides of a triangle and a difference between interior angle values, but have several solutions not a single value. In such a case, the skew matrix and the scale matrix may be obtained, assuming that 'skew' is present only in an x or y direction. A different transform matrix may be obtained through the transform of an algorithm because the obtained transform matrix is not a single solution.

The 3D object transform module 166 generates a transformed 3D object by applying the 3D transform matrices, generated by the 3D transform matrix generation module 164, to CSS transform. That is, if CSS transform is applied to lattice elements having vertexes changed using the generated 3D transform matrices, a transformed 3D object can be generated in response to an object manipulation signal. CSS transform is technology in which a 2D transform effect or a 3D transform effect is applied to each of elements that form HTML. CSS transform provides a matrix interface for manipulating 'rotate', 'translate', 'scale', and 'skew' and combining and processing a combination of 'rotate', 'translate', 'scale', and 'skew'. CSS transform is technology for individually manipulating HTML elements of a quadrangle form and is chiefly used in parts that require simple 3D effects, such as a screen switch and a menu configuration, not in tasks for generating a complicated 3D object including a plurality of polygons or for changing an outward shape of such an object. CSS transform has high compatibility because it is supported by the latest mobile devices in addition to PCs.

Figure 5:
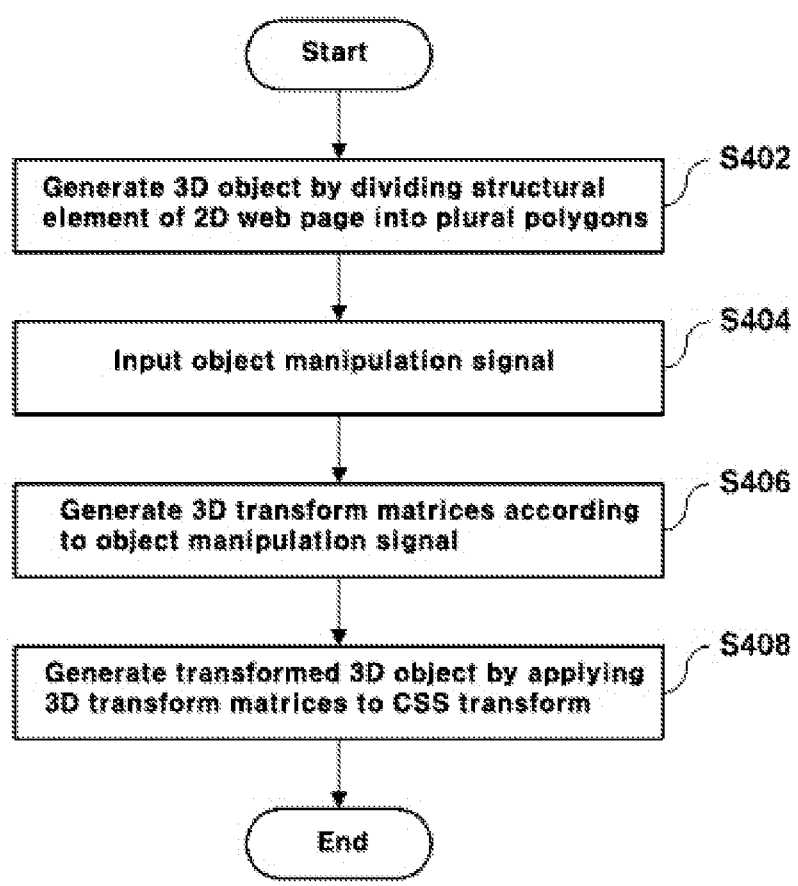
FIG. 5 is a flowchart illustrating a method of generating and manipulating, by the 3D object generation apparatus, a 3D object in accordance with an embodiment of the present invention.

FIG. 5 is a flowchart illustrating a method of generating and manipulating, by the 3D object generation apparatus, a 3D object in accordance with an embodiment of the present invention.

Referring to FIG. 5, the 3D object generation apparatus generates a 3D object by latticizing and dividing a structural element of a 2D web page into a plurality of polygons (S402). In order to generate an object of a free 3D form, a task for dividing the structural element of a web page, that is, a rectangle of a plane form, into a plurality of polygons (triangle object) is necessary. Accordingly, in order to generate a 3D object, the 3D object generation apparatus divides a structural element of a 2D web page into a plurality of polygons. A method of generating, by the 3D object generation apparatus, a 3D object is described in detail with reference to FIG. 6.

After performing step S402, when an object manipulation signal is inputted in the generated 3D object (S404), the 3D object generation apparatus generates 3D transform matrices according to the inputted object manipulation signal (S406). Thereafter, the 3D object generation apparatus generates a transformed 3D object by applying the generated 3D transform matrices to CSS transform (S408).

A method of generating, by the 3D object generation apparatus, a transformed 3D object is described in detail with reference to FIG. 8.

Figure 6:
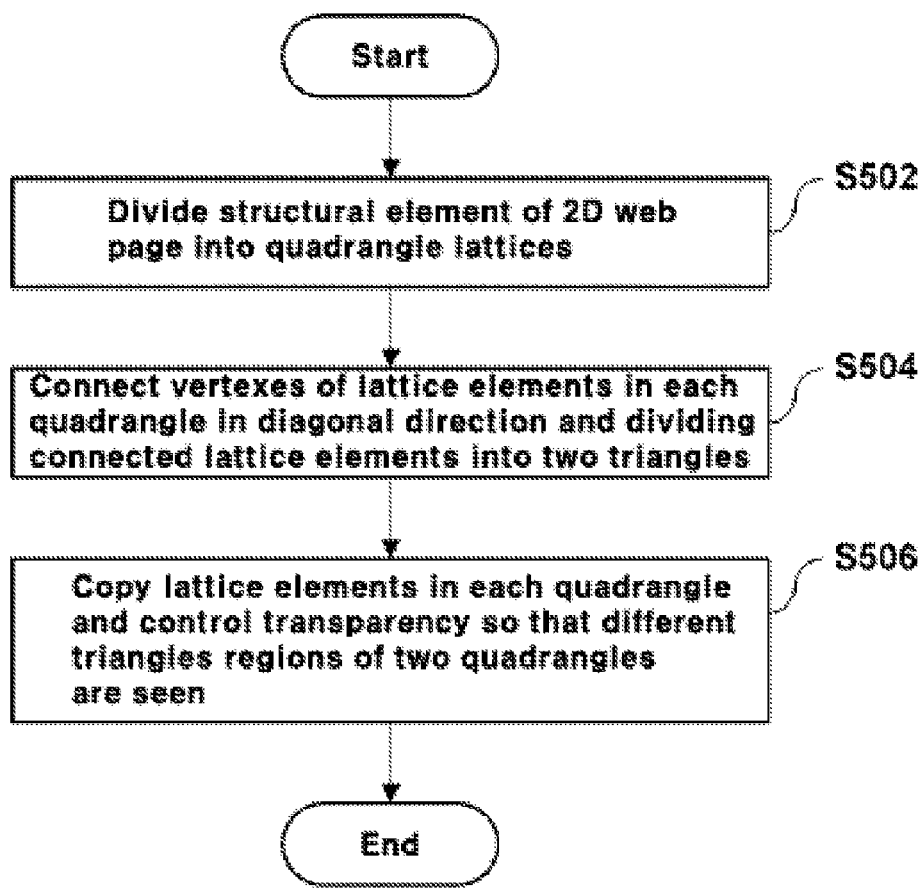
FIG. 6 is a flowchart illustrating a method of generating, by the 3D object generation apparatus, a 3D object in accordance with an embodiment of the present invention.

FIG. 6 is a flowchart illustrating a method of generating, by the 3D object generation apparatus, a 3D object in accordance with an embodiment of the present invention, and FIG. 7 is an exemplary diagram of screens illustrating a method for generating a 3D object in accordance with an embodiment of the present invention.

Referring to FIG. 6, the 3D object generation apparatus divides the structural element of a web page into a specific number of equal quadrangle lattice elements (S502), connects the vertexes of the respective divided quadrangle lattice elements in a diagonal direction, and divides the connected quadrangle lattice elements into two triangles (S504).

After performing step S504, the 3D object generation apparatus copies each of the quadrangle lattice elements and generates a 3D object by controlling the transparency of each of the quadrangle lattice elements so that only different triangle regions of two quadrangles are seen (S506).

A method of generating, by the 3D object generation apparatus, a 3D object is described below with reference to FIG. 7. The 3D object generation apparatus equally divides an image 600, such as (a), into small lattices of a quadrangle form as shown in (b) (610). Thereafter, the 3D object generation apparatus connects the vertexes of respective quadrangle lattice elements in a diagonal direction and divides the connected quadrangle lattice elements into two triangles as in (c). Thereafter, as in (d), the 3D object generation apparatus copies the quadrangle lattice elements and generates a 3D object by controlling transparency so that only an image in an upper left triangle region is seen in a first quadrangle 630a and only an image in a lower left triangle region is seen in a second quadrangle 630b.

Figure 8:
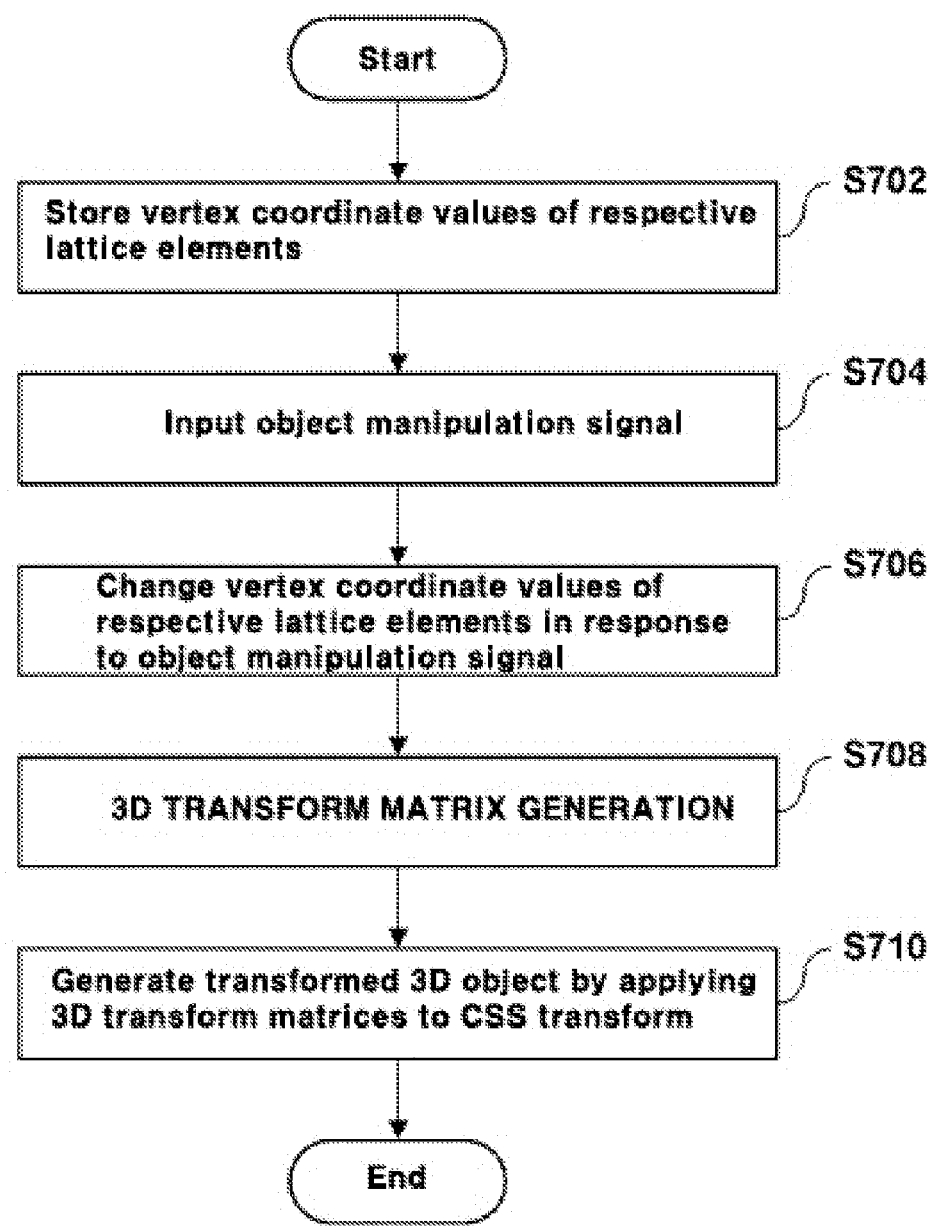
FIG. 8 is a flowchart illustrating a method of generating, by the 3D object generation apparatus, a transformed 3D object in accordance with an embodiment of the present invention.

FIG. 8 is a flowchart illustrating a method of generating, by the 3D object generation apparatus, a transformed 3D object in accordance with an embodiment of the present invention, and FIG. 9 is an exemplary diagram of screens illustrating a method for generating a transformed 3D object in accordance with an embodiment of the present invention.

Referring to FIG. 8, the 3D object generation apparatus stores vertex coordinate values of lattice elements for a 3D object (S702).

After performing step S702, when an object manipulation signal is inputted in the 3D object (S704), the 3D object generation apparatus changes a vertex coordinate value of each lattice element in response to the object manipulation signal (S706) and generates the 3D transform matrices of the lattice elements using the changed vertex coordinate values and the stored vertex coordinate values (S708).

Thereafter, the 3D object generation apparatus generates a transformed 3D object by applying the generated 3D transform matrices to predefined CSS transform (S710).

A method of transforming, by the 3D object generation apparatus, a 3D object is described below with reference to FIG. 9. When a user moves a first quadrangle lattice element 800a and a second quadrangle lattice element 800b in a 3D object, such as FIG. 7(d), as in FIG. 9(a), the 3D object generation apparatus changes vertex coordinate values of the first quadrangle lattice element 800a and the second quadrangle lattice element 800b. Thereafter, the 3D object generation apparatus generates a transformed 3D object 810 by combining the two transformed lattice elements as in (b). Here, the two quadrangle lattice elements can share two vertexes.

Meanwhile, in accordance with another aspect of the present invention, there is provided an electronic device-readable recording medium on which a method for generating a 3D object, including a step of generating quadrangle lattice elements by equally dividing a structural element of a web page into a specific number of quadrangle lattices, a step of connecting the vertexes of the generated quadrangle lattice elements in a diagonal direction, dividing the connected quadrangle lattice elements into two triangles, copying the quadrangle lattice elements, and generating a 3D object by controlling transparency so that only different triangle regions of two quadrangles are seen, a step of, when an object manipulation signal is inputted in the generated 3D object, changing a vertex coordinate value of each of the lattice elements in response to the object manipulation signal and generating 3D transform matrices of the respective lattice elements using the changed vertex coordinate values and the vertex coordinate values before being changed, and a step of generating a transformed 3D object by applying the generated 3D transform matrices to predefined CSS transform, has been recorded in a program form.

Such a method for generating a 3D object can be written in a program form, and pieces of code and code segments that form the program can be easily induced by a programmer skilled in the art. Furthermore, a program regarding the method for generating a 3D object can be stored in a medium readable by an electronic device and can be read and executed by an electronic device.

In accordance with the present invention, a 3D object of a polygon form can be generated and manipulated using only 'rotate', 'translate', and 'scale', that is, basic 3D transform techniques, and 'skew', that is, a 2D transform technique, by emulating a polygon of a triangle form using a quadrangle of a quadrangle form as a basic element.

Furthermore, effects, such as a Genie effect, 3D Morphing, and a page turn effect, can be implemented using CSS 2D/3D transform technology that can be supported in mobile devices and also enable the generation and manipulation of a 3D object based on polygons.

Furthermore, various user interfaces and graphic effects can be provided by generating and manipulating a 3D object based on a polygon having a specific form even in a limited environment (e.g., a mobile web) in which only basic 3D transform is supported.

Furthermore, a 3D object based on polygons can be generated through the latticization of web-based elements.

The present invention can also be applied to an apparatus and method for generating a 3D object, which are capable of generating and manipulating a 3D object of a polygon form using only 'rotate', 'translate', and 'scale', that is, basic 3D transform techniques, and 'skew', that is, a 2D transform technique, by emulating a polygon of a triangle form using a quadrangle of a quadrangle form as a basic element.

As described above, those skilled in the art to which the present invention pertains will understand that the present invention may be implemented in other various forms without departing from the technical spirit or essential characteristics of the present invention. Accordingly, the aforementioned embodiments should not be construed as being limitative, but should be construed as being only illustrative from all aspects. The scope of the present invention is clearly disclosed in the appended claims rather than the detailed description. It should be understood that all modifications or variations derived from the meanings and scope of the present invention and equivalents thereof are included in the scope of the appended claims.

What is claimed is:

1. A 3D object generation apparatus including a user device having a communication function and a short-range communication function, comprising:
   a 3D object generation unit for generating a 3D object by latticizing and dividing a structural element of a 2D web page into a plurality of polygons; and
   a 3D object manipulation processing unit for, when an object manipulation signal is inputted in the generated 3D object, generating 3D transform matrices by changing vertex coordinate values of respective lattice elements in response to the object manipulation signal and generating a transformed 3D object by applying the generated 3D transform matrices to predefined Cascading Style Sheet (CSS) transform.

2. The 3D object generation apparatus of claim 1, wherein the 3D object generation unit comprises:
   a quadrangle lattice element generation module for generating quadrangle lattice elements by equally dividing the structural element of the web page into a specific number of quadrangle lattices; and
   a 3D object generation module for dividing vertexes of the respective generated quadrangle lattice elements into two triangles in a diagonal direction, copying the quadrangle lattice elements, and generating a plurality of polygons by controlling transparency so that only different triangle regions of two quadrangles are seen.

3. The 3D object generation apparatus of claim 2, wherein the quadrangle lattice element generation module receives an individual image of a lattice form corresponding to an original image from a service providing apparatus or transforms an original image into a bitmap form through internal operation within a browser and generates a lattice image, if the structural element of the web page is an image, and generates the quadrangle lattice elements using a delimitation tag if the structural element of the web page is not an image.

4. The 3D object generation apparatus of claim 1, wherein the 3D object manipulation processing unit comprises:
   a coordinate value memory module for storing the vertex coordinate values of the respective lattice elements that form the 3D object generated by the 3D object generation unit;
   a 3D transform matrix generation module for, when the object manipulation signal is inputted, changing the vertex coordinate values of the respective lattice elements in response to the object manipulation signal and generating the 3D transform matrices of the respective lattice elements using the changed vertex coordinate values and the vertex coordinate values stored in the coordinate value memory module; and
   a 3D object transform module for generating the transformed 3D object by applying the generated 3D transform matrices to the CSS transform.

5. A 3D object generation method in a method of generating and manipulating, by a 3D object generation apparatus including a user device having a communication function and a short-range communication function, a structural element of a 2D web page into a 3D object, the method comprising steps of:
   (a) generating, by the user device, quadrangle lattice elements by equally dividing the structural element of the web page into a specific number of quadrangle lattices; and
   (b) connecting, by the user device, vertexes of the respective generated quadrangle lattice elements in a diagonal direction, dividing the connected quadrangle lattice elements into two triangles, copying the quadrangle lattice elements, and generating the 3D object by controlling transparency so that only different triangle regions of two quadrangles are seen.

6. The 3D object generation method of claim 5, further comprising steps of:
   when an object manipulation signal is inputted in the generated 3D object, changing vertex coordinate values of the respective lattice elements in response to the object manipulation signal and generating 3D transform matrices of the respective lattice elements using the changed vertex coordinate values and vertex coordinate values before being changed, after the step (b); and
   generating a transformed 3D object by applying the generated 3D transform matrices to predefined CSS transform.

7. The 3D object generation method of claim 5, wherein in the step (b), an individual image of a lattice form corresponding to an original image is received from a service providing apparatus or an original image is transformed into a bitmap form through internal operation within a browser and a lattice image is generated if the structural element of the web page is an image, and the quadrangle lattice elements are generated using a delimitation tag if the structural element of the web page is not an image.

8. A non-transitory electronic device-readable recording medium on which a method for generating a 3D object is recorded in a program form performed by a user device having a communication function and a short-range communication function, the method comprising steps of:
   generating, by the user device, quadrangle lattice elements by equally dividing a structural element of a web page into a specific number of quadrangle lattices;

connecting, by the user device, vertexes of the respective generated quadrangle lattice elements in a diagonal direction, dividing the connected quadrangle lattice elements into two triangles, copying the quadrangle lattice elements, and generating a 3D object by controlling transparency so that two quadrangles are seen only in different triangle regions;

when an object manipulation signal is inputted in the generated 3D object, changing a vertex coordinate value of each of the lattice elements in response to the object manipulation signal and generating 3D transform matrices of the respective lattice elements using the changed vertex coordinate values and the vertex coordinate values before being changed; and generating, by the user device, a transformed 3D object by applying the generated 3D transform matrices to predefined CSS transform.

9. The 3D object generation apparatus of claim 1, wherein the user device is one selected from the group consisting of a notebook, a wireless communication terminal, a smart phone, a Portable Media Player (PMP), a Portable Digital Assistant (PDA), a tablet PC, a set-top box, and smart TV.

10. The 3D object generation method of claim 5, wherein the user device is one selected from the group consisting of a notebook, a wireless communication terminal, a smart phone, a Portable Media Player (PMP), a Portable Digital Assistant (PDA), a tablet PC, a set-top box, and smart TV.

11. The non-transitory electronic device-readable recording medium of claim 8, wherein the user device is one selected from the group consisting of a notebook, a wireless communication terminal, a smart phone, a Portable Media Player (PMP), a Portable Digital Assistant (PDA), a tablet PC, a set-top box, and smart TV.

12. The 3D object generation apparatus of claim 3, further comprising:

a communication unit including at least one selected from the group consisting of a mobile communication module, a satellite communication module, an Internet module, and a Wi-Fi module, for connecting the 3D object generation apparatus and the service providing apparatus over a communication network.

13. The 3D object generation apparatus of claim 1, further comprising:

an input unit for receiving a user request for controlling an operation of the 3D object generation apparatus, and converting the received user request into an electrical signal, wherein the object manipulation signal is converted by the input unit, and wherein the input unit comprises at least one selected from the group consisting of a keyboard, a keypad, and a touch screen.

14. The 3D object generation apparatus of claim 1, further comprising:

an output unit for displaying data for the 2D web page, wherein the output unit comprises at least one selected from the group consisting of a Liquid Crystal Display (LCD), Organic Light Emitting Diodes (OLED), and a touch screen form along with an input unit.

15. The 3D object generation method of claim 5, wherein the user device further comprises:

a communication unit including at least one selected from the group consisting of a mobile communication module, a satellite communication module, an Internet module, and a Wi-Fi module, for connecting the 3D object generation apparatus and a service providing apparatus over a communication network.

16. The 3D object generation method of claim 6, wherein the user device further comprises:

an input unit for receiving a user request for controlling an operation of the 3D object generation apparatus, and converting the received user request into an electrical signal, wherein the object manipulation signal is converted by the input unit, and wherein the input unit comprises at least one selected from the group consisting of a keyboard, a keypad, and a touch screen.

17. The 3D object generation method of claim 5, wherein the user device further comprises:

an output unit for displaying data for the 2D web page, wherein the output unit comprises at least one selected from the group consisting of a Liquid Crystal Display (LCD), Organic Light Emitting Diodes (OLED), and a touch screen form along with an input unit.

\* \* \* \* \*